United States Patent [19]

Gibson

[11] 4,393,595
[45] Jul. 19, 1983

[54] TUBE ADJUSTMENT GASKET AND RIFLE SCOPE EMPLOYING SAME

[75] Inventor: Dale E. Gibson, Salem, Oreg.

[73] Assignee: Leupold & Stevens, Inc., Beaverton, Oreg.

[21] Appl. No.: 284,966

[22] Filed: Jul. 20, 1981

[51] Int. Cl.³ .............................................. F41G 1/38
[52] U.S. Cl. ................................... 33/245; 33/246
[58] Field of Search .................. 33/245, 246, 233; 411/154, 155, 156, 160–164, 544, 545

[56] References Cited

U.S. PATENT DOCUMENTS

| | | | |
|---|---|---|---|
| 236,624 | 1/1881 | Pratt | 411/544 |
| 299,977 | 6/1884 | Garvey | 411/544 |
| 579,643 | 3/1897 | Gleason | 411/544 |
| 1,088,137 | 2/1914 | Fiojecano | 33/246 |
| 1,926,917 | 9/1933 | Rosenberg | 411/544 |
| 1,963,028 | 6/1935 | Olson | 411/544 |
| 2,278,062 | 3/1942 | Koharovich | 411/160 |
| 2,322,776 | 6/1943 | Poupitch | 411/544 |
| 2,955,512 | 10/1960 | Kollmorgen et al. | 33/246 |
| 3,390,713 | 7/1968 | Gutshall | 411/544 |
| 3,492,733 | 2/1970 | Leatherwood | 33/245 |
| 3,902,251 | 9/1975 | Ross | 33/246 |
| 4,191,872 | 3/1980 | Sorenson | 200/296 |
| 4,257,465 | 3/1981 | Berg | 411/147 |

FOREIGN PATENT DOCUMENTS

| | | | |
|---|---|---|---|
| 2304470 | 8/1973 | Fed. Rep. of Germany | 411/155 |
| 372823 | 2/1940 | Italy | 411/544 |
| 7415863 | 6/1976 | Netherlands | 411/545 |
| 108937 | 8/1917 | United Kingdom | 411/544 |

*Primary Examiner*—Willis Little
*Attorney, Agent, or Firm*—Klarquist, Sparkman, Campbell, Leigh, Whinston & Dellett

[57] ABSTRACT

An adjustment gasket for resiliently locking a threadedly connected tube against accidental rotation while permitting rotational adjustment of such tube, is described. The adjustment gasket may be clamped between two threadedly interconnected tubes in a rifle scope to permit rotational adjustment of such tubes such as for rotational alignment of the lenses during manufacture of such scope, while preventing accidental rotation of such tubes. The adjustment gasket is a resilient ring member of synthetic plastic material which is compressible longitudinally of such tubes to resiliently lock such tubes against accidental rotation without damaging the tubes. The adjustment gasket is in the form of an undulated ring having a plurality of concave arcuate areas separated by flat areas to provide a set of surface areas on each side of the gasket. The two sets of surface areas are angularly offset so that the flat areas on one side of the gasket are in alignment with the arcuate areas on the other side of the gasket. As a result, the gasket is capable of longitudinal compression by an amount greater than one-half of the minimum width of such gasket. The range of longitudinal compression is sufficient to enable one complete rotation of the interconnected tubes for adjustment purposes, while maintaining the tubes in resilient tension to lock them against accidental rotation.

23 Claims, 6 Drawing Figures

TUBE ADJUSTMENT GASKET AND RIFLE SCOPE EMPLOYING SAME

BACKGROUND OF INVENTION

The subject matter of the present invention relates generally to tube adjustment gaskets which resiliently lock a threadedly connected tube against accidental rotation without damaging the tube, while permitting manual rotational adjustment of such tube. More particularly, the present invention relates to adjustment gaskets of synthetic plastic material which have concave arcuate surface portions separated by flat surface portions to enable longitudinally compression of the gasket. The compressed gasket between a pair of threadedly connected tubes maintains the tubes in resilient tension to lock them against accidental rotation, while enabling rotational adjustment of such tubes over the compression range of the gasket. The adjustment gasket of the present invention can be used in a rifle scope between threadedly interconnected tubular members, such as between the eyepiece lens tube and the turret housing or between the objective lens tube and the turret housing of such scope to rotationally align the eyepiece lens and the objective lens with the turret housing. This is especially useful during the manufacturing of such rifle scope in that it enables a pair of interconnected tubes to be adjusted to their proper calibrated rotational position and maintained in such adjusted position during further manufacturing steps until they are permanently fixed into position by glue. Thus, the adjustment gasket avoids the need for matched parts machining to provide matched pairs of tubes which must be maintained together as a matched pair during manufacturing. This considerably reduces the expense of manufacture.

It has previously been proposed in U.S. Pat. No. 3,390,713 of Gutshall, issued July 2, 1968 to provide a metal lock washer of undulated shape with flat locking abutments projecting from the bottom of the undulation valleys. However, this lock washer is not made of synthetic plastic material and the metal locking projections have a "chisel-like edge" which embeds into and damages the workpiece or bolt nut between which it is clamped. Also, the lock washer is not provided with flat portions between concave arcuate portions on each side of such washer to enable longitudinal compression without damaging the workpiece in the manner of the present invention.

Metal lock washers such as that of U.S. Pat. No. 299,977 of Garvey granted June 10, 1884, as well as, British Pat. No. 108,937 of Webb granted Aug. 30, 1917 and Italian Pat. No. 372,823 of Thode granted in 1939 are unsuitable as adjustment gaskets for threadedly connected tubes because the sharp metal projections of such lock washers damage the workpiece. Thus, like the above discussed Gutshall patent, their metal projections dig into and embed into the workpieces to lock them against rotation and can only be adjusted when considerable force is exerted by means of a wrench or other similar tool. However, with the plastic adjustment gasket of the present invention, the interconnected tubes can have their rotational position adjusted manually while the gasket maintains such tubes under resilient tension over the compression range of the gasket.

U.S. Pat. No. 4,191,872 of Sorenson granted Mar. 4, 1980 and U.S. Pat. No. 4,257,465 of Berg granted Mar. 24, 1981, both show lock washers made of synthetic plastic material. However, they operate in an entirely different manner and they are not provided with an undulated shape to enable longitudinal compression of the washer. The lock washer of Sorenson is flat with two key type locking projections which are inserted into key openings in the workpieces so there is no longitudinal compression of the washer. Also, the lock washer of Berg provides conical locking projections which are bent to provide locking without longitudinal compression of the washer body. Thus, neither of these patents show a lock washer of undulated shape having alternate concave arcuate areas and flat areas on each side thereof to enable longitudinal compression of the washer and resilient locking without damage to the workpiece, in the manner of the adjustment gasket of the present invention.

In addition, it has been previously proposed in U.S. Pat. No. 579,643 of Gleason, granted Mar. 30, 1897 to provide a pipe coupling made of the metal lead which is not resilient, but is provided with indentations or teeth on the opposite side thereof. These teeth mate with the teeth of two pipe coupling collars threadedly attached to the outside of the pipes, compressing such coupling to prevent relative movement and leakage between the pipes. Thus, this pipe coupling is for an entirely different purpose than the resilient plastic adjustment gasket of the present invention.

The adjustment gasket of the present invention and tube assemblies employing such gasket have the advantage of providing manual rotational adjustment of the interconnected tubes while maintaining the tubes in resilient locked condition to prevent accidential rotation thereof, in a simple and inexpensive manner. The adjustment gaskets do not damage the tubes or other workpieces and are reuseable since they are made of resilient synthetic plastic material. Furthermore, the adjustment gasket of the present invention is capable of sufficient longitudinal compression to enable a full 360° rotational adjustment of the interconnected tubular members while maintaining them in resilient tension over the compression range of the gasket. By providing the gasket with an undulating shape including a plurality of concave arcuate surface areas alternating with flat surface areas on one or both sides of the gasket, such gasket is provided with a large longitudinal compression range greater than one-half the minimum longitudinal thickness of the gasket as measured between the flat area on one side and the bottom of the arcuate portion on the opposite side of such gasket. A rifle scope employing the adjustment gasket between threadedly connected tubes thereof is easier and less expensive to manufacture since it does not require custom matched machining of parts or matched pairs of tubes.

SUMMARY OF THE INVENTION

It is therefore one object of the present invention to provide an improved adjustment gasket in the form of a resilient ring member of synthetic plastic material which is longitudinally compressible to resiliently lock two threadedly connected tubes or other workpieces against accidential rotation thereof while permitting manual rotational adjustment of the tubes in a simple and inexpensive manner.

Another object of the invention is to provide such an adjustment gasket with a large range of longitudinal compression which enables rotational adjustment of the tubes over at least one complete 360° rotation while maintaining such tubes in resilient tension to lock such tubes against accidental rotation thereof.

A further object of the invention is to provide such an adjustment gasket with an undulated shape having a plurality of concave arcuate surface areas alternating with flat surface areas on one or both sides of such gasket to provide the large compression range while preventing damage to the tubes or other workpieces between which the gasket is compressed.

An additional object of the invention is to provide an assembly of tubular members having such an adjustment gasket clamped in longitudinal compression between two threadedly interconnected tubular members in order to resiliently lock them against accidental rotation while permitting rotational adjustment of such tubular members relative to each other.

Still another object of the invention is to provide an improved rifle scope employing such a tubular assembly including such adjustment gasket to enable easier rotational alignment of lenses in such scope.

A still further object of the invention is to provide such a rifle scope which is less expensive to manufacture and does not require the use of matched pairs of tubes or matched machining of parts.

DRAWINGS

Other objects and advantages of the present invention will be apparent from the following detailed description of a preferred embodiment thereof and from the attached drawings of which:

DESCRIPTION OF PREFERRED EMBODIMENT

Figure 1:
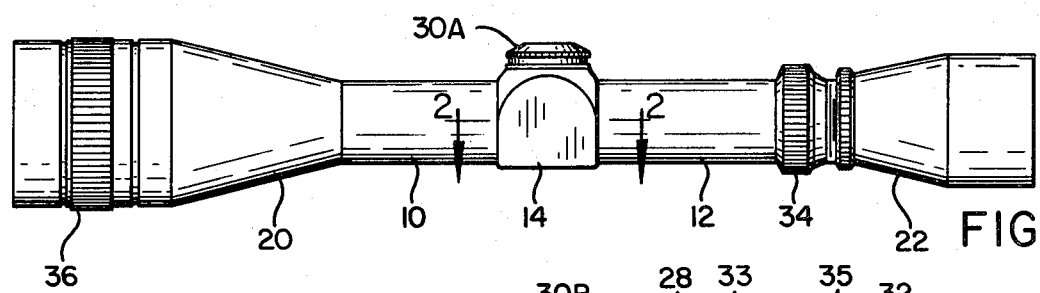
FIG. 1 is a plan view of a rifle scope employing tubular assemblies and adjustment gaskets in accordance with the present invention.
Figure 2:
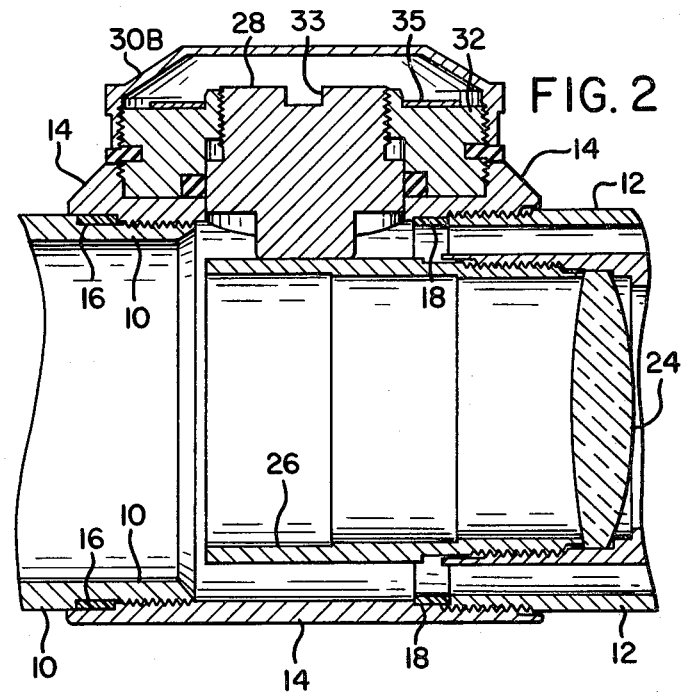
FIG. 2 is an enlarged horizontal section view taken along the line 2—2 of FIG. 1 showing the positions of the two adjustment gaskets.

As shown in FIGS. 1 and 2, a rifle scope made in accordance with the present invention includes an objective lens tube 10 and an eyepiece lens tube 12 which are threadedly connected to the opposite sides of a tubular turret housing member 14 with a first adjustment gasket 16 and a second adjustment gasket 18 between such two interconnections. The objective lens tube 10 is also threadedly connected at its left end to an objective shell 20 containing an objective lens. The eyepiece lens tube 12 is threadedly connected at its right end to an eyepiece shell 22 containing the eyepiece lenses. In addition, the eyepiece tube 12 also contains a field lens 24 and a pair of independently adjusted erector lenses (not shown) whose spacing is adjusted to vary the magnification of the scope.

The field lens 24 and the erector lenses are mounted within an internal lens tube 26 which is supported within the eyepiece tube 12 by a pivot connection near its junction with the eyepiece shell 22. The internal lens tube 26 is pivoted in a vertical direction and a horizontal direction by means of a pair of X—Y adjustment screws 28 provided within the turret housing 14 and extending at right angles to each other in position to engage the free end of such lens tube. The two screws 28 are covered by caps 30A and 30B threaded onto a ring-shaped adjustment housing 32. The adjustment housing 32 has an axial passageway with internal threads connected to the threads of adjustment screw 28 for longitudinal movement of the screw by rotation thereof with a coin or screw driver in slot 33.

The internal lens tube 26 is resiliently urged up against the adjustment screw 28 by means of a leaf spring (not shown) which is positioned between such tube and the inside of the turret housing 14 or the eyepiece tube 12. Thus, windage and elevation adjustments can be made on the position of the internal lens tube 26 by removing the caps 30A and 30B and rotating the adjustment screws 28. The adjustment screws are set at their proper positions to compensate for changes in elevation and windage at a selected settings on two dials 35 provided on the top and side of adjustment housing 32 by means of a screw driver inserted into the slots 33 in the top of each adjustment screw.

The magnification of the scope can be varied by adjusting a power selector ring 34 which is coupled in a conventional manner (not shown) by a connecting pin extending through the eyepiece tube 12 to a cam tube connected by cam followers to the mounts of a pair of erector lenses provided within the internal lens tube 26. This varies the relative positions and spacing of the erector lenses with respect to each other and with respect to the other lenses in the scope. In addition, the relative position of the objective lens within shell 20 can also be varied in a conventional manner by adjusting an objective adjustment ring 36 on the objective shield.

Figure 4:
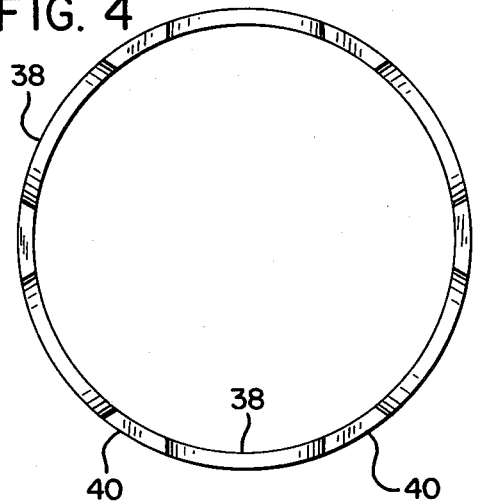
FIG. 4 is a side view of the gasket of FIG. 3.
Figure 5:
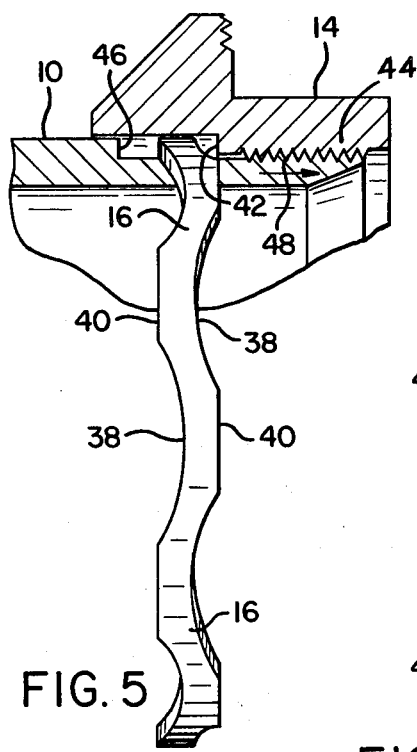
FIG. 5 is an enlarged view of a portion of one tube assembly using the gasket to connect the objective lens tube to the turret housing in the scope of FIGS. 1 and 2.
Figure 3:
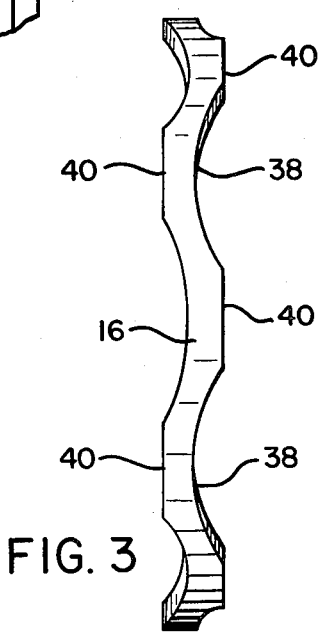
FIG. 3 shows a plan view of an adjustment gasket in accordance with the present invention.
Figure 6:
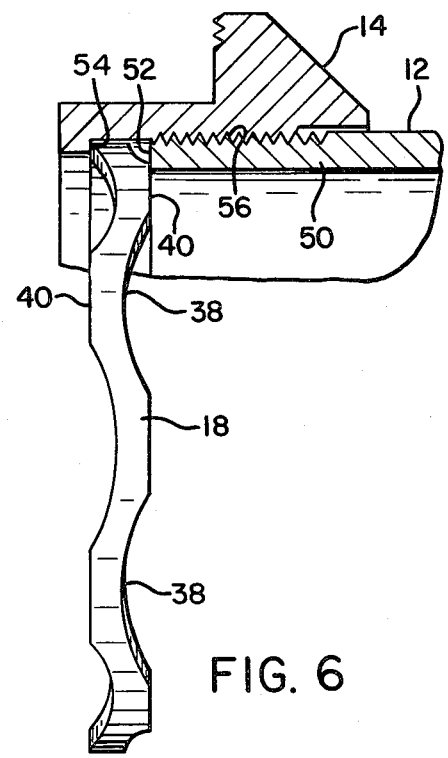
FIG. 6 is an enlarged view of a portion of another tube assembly with the gasket clamped between the eyepiece lens tube and the turret housing in the scope of FIGS. 1 and 2.

The present invention relates primarily to the adjustment gaskets 16 and 18 and the tube assemblies 10, 14 and 12, 14 employing such gaskets by clamping them between two threadedly connected tubes in the manners shown in FIGS. 5 and 6. As shown in FIGS. 3 and 4, each of the adjustment gaskets 16 and 18 are resilient ring members provided with a plurality of resilient locking means thereon spaced about the longitudinal axis of such ring member which are formed by a plurality of concave arcuate surface areas 38 separated by a plurality of flat surface areas 40 in an alternating manner around the ring member on one or both sides thereof. The flat areas each have a width extending completely across the entire radial wall thickness of the gasket and have a length greater than the maximum width of the gasket between two flat areas on opposite sides thereof which may be about 0.100 inch. Thus, flat areas 40 provide relatively large areas of contact with the tubes. The two sets of surface areas on opposite sides of the gasket are offset with respect to each other. Thus, the flat surface areas 40 on the right side of the ring member 16 are positioned above the bottom of the concave arcuate surfaces 38 on the left side of such gasket member and vice versa. As a result, the gasket member is capable of longitudinal compression of the resilient locking means 38 and 40 over a range equal to the depth of the arcuate surface areas 34 which, for example, may be approximately 0.042 inch as measured from the plane of the flat surfaces 40 to the bottoms of the arcuate surfaces 38 on the same side of the gasket as such flat surfaces. The minimum thickness of such a gasket from the flat surface 40 on one side of the gasket member to the bottom of an adjacent arcuate surface on the opposite side thereof is about 0.058 inch. Therefore, the percent of longitudinal compression expressed in terms of the minimum width of the gasket is given by 0.042 divided by 0.058×100% or 72.4% of such minimum width. Thus, it is clear that the range of compression of the gasket is greater than at least one-half the minimum longitudinal width of the gasket.

In the preferred example shown, six equal arcuate areas 38 and six equal flat areas 40 are provided on each side of the gasket and are spaced apart equally 60° from the adjacent surface area of the same kind. The radius of curvature of the arcuate surfaces 38 may be 0.375 inch and the gasket wall thickness measured radially and shown in FIG. 4 is 0.028 inch. Furthermore, the maximum width of the gasket measured between flat surfaces 40 on opposite sides thereof is about 0.100 inch, while the outer diameter of the ring member forming gasket 16 is about 1.000 inch, all such dimensions except the radius of curvature have a tolerance of ±0.002 inch.

As shown in FIG. 5, the gasket 16 may be positioned over the threaded right end 48 of the eyepiece tube 10 so that it surrounds such threaded end. A shoulder 42 is provided inside the left end of the turret housing 14 outside of the internal threaded portion 44 at the left end of such turret housing. Threaded portions 44 and 48 may be provided with suitable threads of, for example, 48 threads per inch. Another shoulder 46 is provided on the exterior of the eyepiece tube to the left of the threaded portion 48 of such tube. The gasket is clamped between shoulders 42 and 46 on tubular members 10 and 14.

In the position shown in FIG. 5, the gasket 16 has not yet been clamped between the threadedly connected members 10 and 14. Such clamping and compression of the gasket member occurs upon further threading of the eyepiece tube 10 into the turret housing 14 until shoulder 46 engages the flat areas 40 on the left side of the gasket and shoulder 42 engages the flat areas 40 on the right side of such gasket. When the spacing between shoulders 42 and 46 is reduced to less than the maximum width of the gasket between the flat areas 40 on opposite sides thereof, such gasket is placed under compression. This compression of the gasket provides a resilient tension to the tubular members 10 and 14 to resiliently lock them against accidential rotational movement. At the same time, the shape of gasket 16 enables easy manual rotational adjustment of tube 10 relative to tubular member 14. As a result, the eyepiece tube 10 can be rotated relative to the turret housing 14 through at least one complete 360° revolution while being maintained in resilient tension over the compression range of the gasket. This rotation may be done during manufacturing to rotationally align the objective lens with the turret housing 14 in a calibrated setting position. The tube 10 and housing 14 are locked in this calibrated position for further manufacturing steps and later they may be secured in this calibrated position by means of glue or other more permanent means.

As shown in FIG. 6, the tube assembly includes the eyepiece tube 12 whose externally threaded left end 50 engages internal threads 56 at the right side of the tubular turret housing 14. The adjustment gasket 18 is clamped between the outer edge 52 of the left end of tube 12 and a shoulder 54 within the right side of the turret housing 14 to the left of the threads 56. Thus, gasket 18 is compressed when the space between end 52 and shoulder 54 is less than the maximum width of such gasket as measured between the flat areas 40 on opposite sides of such gasket. In this tube assembly, the radial wall thickness of the gasket is 0.030 inch and its outer diameter is 0.978 inch, while the radial width of the shoulder 54 is about 0.012 inch or approximately one-half of such wall thickness. Thus, the inner and outer diameters of shoulder 54 are 0.950 and 0.974 inch. The threaded end 50 of the eyepiece tube 12 has a radial width of 0.039 inch or greater than such wall thickness and has an inner diameter of 0.922 inch, an outer diameter of 1.000 inch. The maximum width of the gasket 18 is 0.102 inch and its minimum width is 0.062 inch while the depth of the concave depressions 38 is 0.040 inch. A tube assembly of these dimensions accommodates pivoting of the internal lens tube 26 by adjustment screw 28 and is satisfactory to compress the gasket 18 between tube 12 and turret housing 14.

The adjustment gaskets 16 and 18 are made of any suitable resilient synthetic plastic material such as an acetal resin of the linear polyoxymethylene type sold under the trademark DELRIN, by molding such gasket out of such plastic material. In order to distinguish gaskets 16 and 18 from each other because they are of slightly different diameters and width dimensions, such gaskets may be dyed a different color, such as red for gasket 18 and blue for gasket 16.

It will be obvious to those having ordinary skill in the art that many changes may be made in the preferred embodiment of the invention. Therefore, the scope of the present invention is to be determined by the following claims.

I claim:

1. An adjustment gasket of synthetic plastic material, comprising:
    a resilient ring member;
    a plurality of resilient locking means provided on the ring member at positions spaced about the longitudinal axis of said ring member, including a plurality of concave curved surface portions of substantially the same shape spaced about the periphery of said ring member; and
    a plurality of flat surface portions spaced between said concave portions about the periphery of said ring member and positioned longitudinally outward of said arcuate portions so that a first set of alternating flat portions and arcuate portions are provided on at least one side of said ring member substantially the same radial distance from the axis of the ring member to enable longitudinal compression of said resilient locking means.

2. A gasket in accordance with claim 1 in which the ring member is also provided with a second set of alternating flat portions and concave arcuate portions on the other side thereof similar to said first set.

3. A gasket in accordance with claim 2 in which the flat portions of said first set are aligned with the arcuate portions of said second set and the flat portions of said second set are aligned with the arcuate portions of said first set.

4. A gasket in accordance with claim 3 in which the flat portions are aligned with the bottoms of the valleys of said arcuate portions in the opposite set.

5. A gasket in accordance with claim 1 in which the ring member is longitudinally compressible over a distance of at least one-half the minimum longitudinal thickness of said ring member.

6. A gasket in accordance with claim 1 in which the maximum longitudinal width of the ring member between the flat portions of opposite sets is greater than the radial thickness of the ring member.

7. A gasket in accordance with claim 1 in which the gasket is made of a molded unitary member of synthetic plastic material.

8. A gasket in accordance with claim 7 in which the plastic material is an acetal resin.

9. An optical device including a lens tube assembly comprising:
- a first tube and a second member threadedly connected together;
- an adjustment gasket clamped between the first tube and second member to prevent accidental rotation of said tube but enabling rotational adjustment of said tube relative to said second member;
- said gasket being a resilient ring member of synthetic plastic material having a plurality of resilient locking means provided on the ring member including a plurality of concave arcuate surface portions of substantially the same shape spaced about the periphery of said ring member, and a plurality of flat surface portions spaced between said arcuate portions about the periphery of said ring member and positioned longitudinally outward of said arcuate portions so that a first set of alternating flat portions and arcuate portions are provided on at least one side of said ring member to enable longitudinal compression of said resilient locking means.

10. An assembly in accordance with claim 9 in which the ring member is also provided with a second set of alternating flat portions and arcuate portions on the other side thereof similar to said first set.

11. An assembly in accordance with claim 10 in which the flat portions of said first set are aligned with the arcuate portions of said second set and the flat portions of said second set are aligned with the arcuate portions of said first set.

12. An assembly in accordance with claim 11 in which the flat portions are aligned with the bottoms of the valleys of said arcuate portions in the opposite set.

13. An assembly in accordance with claim 9 in which the flat portions have a length greater than the longitudinal thickness of the ring member.

14. An assembly in accordance with claim 9 in which the maximum longitudinal width of the ring member between the flat portions of opposite sets is greater than the radial thickness of the ring member.

15. An assembly in accordance with claim 9 in which the gasket is made of a molded unitary member of synthetic plastic material.

16. An assembly in accordance with claim 15 in which the plastic material is an acetal resin.

17. A rifle scope assembly comprising:
- a first tube containing a first lens means and having threads on one end thereof;
- a second tubular member having threads on one end thereof;
- said first tube being fastened to said second tube by said threads; and
- an adjustment gasket in the form of a resilient ring of synthetic plastic material having a plurality of resilient locking means thereon which are compressible longitudinally, said gasket being compressed between the first and second tubes to prevent accidental rotation thereof but enabling rotational adjustment of said tubes.

18. A scope in accordance with claim 17 which also includes a third tube having external threads on one end thereof being fastened to said second tube by threads on the other end of said second tube, and another adjustment gasket in the form of a resilient ring of synthetic plastic material is provided around the threaded end of said third tube and compressed between the other end of said second tube and a shoulder on said third tube.

19. A scope in accordance with claim 17 in which said gasket includes a plurality of concave arcuate surface portions of substantially the same shape spaced about the periphery of said ring member and a plurality of flat surface portions spaced between said arcuate portions so that a first set of alternating flat portions and arcuate portions are provided on at least one side of said ring member.

20. A scope in accordance with claim 19 in which the ring member is also provided with a second set of alternating flat portions and concave arcuate portions on the other side thereof similar to said first set.

21. A scope in accordance with claim 20 in which the flat portions of said first set are aligned with the arcuate portions of said second set and the flat portions of said second set are aligned with the arcuate portions of said first set.

22. A scope in accordance with claim 17 in which the gasket is made of a molded unitary member of synthetic plastic material.

23. A scope in accordance with claim 22 in which the plastic material is an acetal resin.

* * * * *